G. G. DAVIS.
VEHICLE WHEEL.
APPLICATION FILED DEC. 17, 1914.
1,152,150.
Patented Aug. 31, 1915.
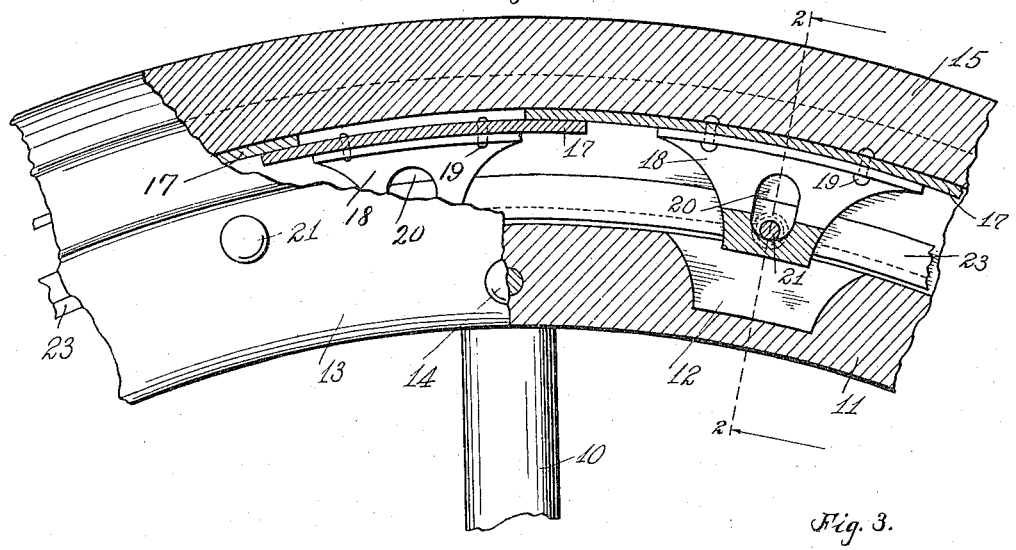
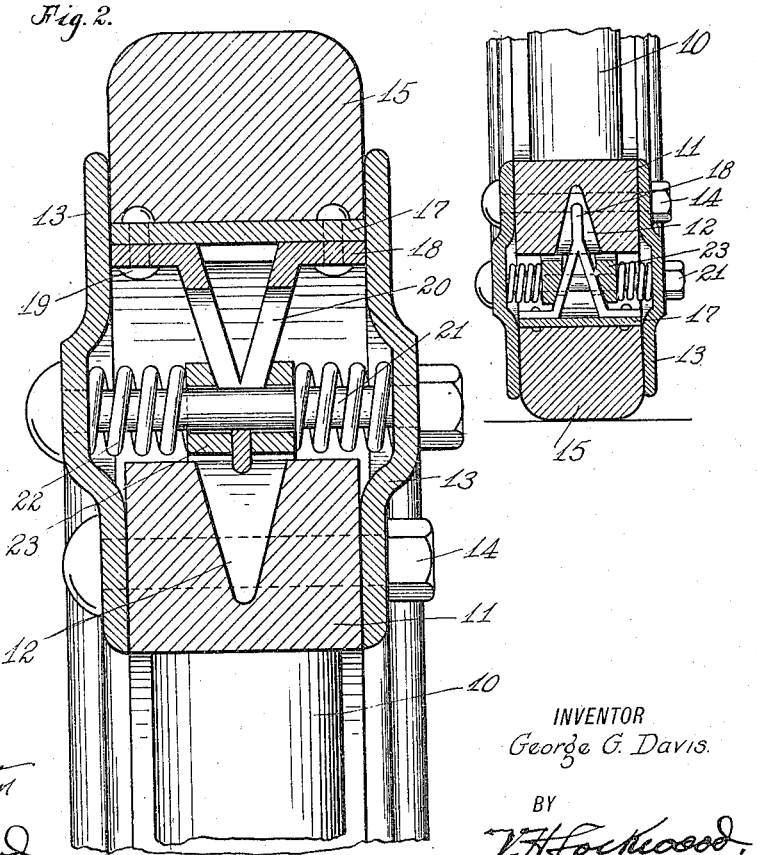
WITNESSES:
INVENTOR
George G. Davis.
BY
ATTORNEY
COLUMBIA PLANOGRAPH CO., WASHINGTON, D. C.

UNITED STATES PATENT OFFICE.

GEORGE G. DAVIS, OF INDIANAPOLIS, INDIANA, ASSIGNOR OF ONE-HALF TO JAMES A. GOHEN, OF INDIANAPOLIS, INDIANA.

VEHICLE-WHEEL.

1,152,150.   Specification of Letters Patent.   Patented Aug. 31, 1915.

Application filed December 17, 1914. Serial No. 877,787.

*To all whom it may concern:*

Be it known that I, GEORGE G. DAVIS, a citizen of the United States, and a resident of Indianapolis, county of Marion, and State of Indiana, have invented a certain new and useful Vehicle-Wheel; and I do hereby declare that the following is a full, clear, and exact description thereof, reference being had to the accompanying drawings, in which like letters refer to like parts.

The object of this invention is to make a practical resilient vehicle wheel, the tire of which is non-puncturable. Wheels of this type have been devised, but they were not practical. Usually they are lacking in resiliency, at least they are not sufficiently and readily responsive to the vibratory movements required by the roadway. They are also usually unable to stand up against the strains and stresses to which they are subjected, particularly when turning a corner or running obliquely against a curb or railway rail.

The vehicle wheel herein set forth overcomes all of said objections and is unusually simple and strong in construction and yet it is exceedingly responsive in its resiliency.

The full nature of the invention will be understood from the accompanying drawings and the following description and claims.

In the drawings, Figure 1 is a view, partly in side elevation of a portion of the wheel, and partly in central vertical section. Fig. 2 is a transverse section through a portion of the wheel taken on line 2—2 of Fig. 1. Fig. 3 is a section similar to that shown in Fig. 2, through the bottom of the wheel, with parts in position under influence of a load.

The body of the wheel may be made in any desired way with a hub, not shown, and with spokes 10 and rim 11. The only peculiarity about the rim is that it has at intervals in it V-shaped recesses 12 which need not project entirely through the same. There is an annular rim plate 13 secured by bolts 14 to each side of the rim 11 and extending radially beyond said rim. Therefore, between these plates 13 and beyond the rim there is an annular chamber in which the inner portion of a solid and continuous rubber tire 15 extends. Said rubber tire is mounted on a series of tire plates, the ends of which overlap each other, as shown in Fig. 1. In the wheel there are three or four or five of these plates 17 in a series extending around the wheel. Their width is substantially the same as that of the chamber between the rim plates 13, but they are arranged so that the plates 17 and the tire 15 may move radially inward and outward, as required, by the load or the springs, as hereafter explained. At intervals inwardly extending V-shaped wedge plates 18 are secured by rivets 19 to said plate 17. There is one of these wedge-shaped plates 18 for each recess 12 in the rim 11 and the function of said recess 12 is to permit the inward movement of said wedge-shaped plate 18. Each side of each plate 18 has a radially extending slot 20 through which a bolt 21 extends loosely and said bolt also extends through the two side rim plates 13, as seen in Fig. 2. On said bolt between each rim plate 13 and said wedge plate 18 there is a spiral spring 22 and an annular friction bearing member 23 loosely mounted. The surfaces of the blocks 23 adjacent the wedge-shaped plate 18 are beveled so as to conform to the surfaces of the wedge. It is to be understood that the following parts are annular and continuous and entirely around the wheel: the rim 11, the side plates 13, the friction members 23, the rubber tire 15 and the series of plates 17 on which the rubber tire is mounted. The following parts are not continuous around the wheel: the wedge plates 18, and recesses 12.

In operation, the load will force the body of the wheel down toward the street surface and such movement will be yieldingly resisted by the solid rubber tire 15 and more particularly by the springs 22 which force the friction members 23 against the wedge-shaped plates 18. In other words, the downward movement of the body of the wheel under the load is resisted by said springs and by the wedge shape of the plates 18 which resist the crowding down movement of the friction members 23 under the weight of the load. In Fig. 2, the condition of the upper part of the wheel is illustrated, which part does not receive the load. The bottom of the wheel would show what appears in Fig. 2 inverted with the rim 11 and side plates 13 down lower, as indicated in Fig. 3. Since the rim and tire are annular, the relative movement of the parts at the top and bottom are the reverse of each other. The overlapping of the tire plates 17 will permit them separately to move inwardly and downward and adjust themselves with relation to each other.

The invention claimed is:

1. A resilient vehicle wheel including a central or body portion having radially extending side plates, an annular tire portion formed of a series of successive overlapping sections radially movable between said side plates, wedge-shaped plates secured to and extending inwardly from said tire portion, and laterally resisting means carried by said side plates for yieldingly opposing the inward movement of said wedge-shaped plates.

2. A resilient vehicle wheel including a central or body portion having radially extending side plates, an annular tire portion formed of a series of successive overlapping sections radially movable between said side plates, wedge-shaped plates secured to and extending inwardly from said tire portion, and spring-pressed friction members carried by said side plates for engaging the sides of said wedge-shaped plates and resisting their inward movement.

3. A resilient vehicle wheel including a central or body portion having a rim, annular side plates secured to said rim and projecting beyond the same, bolts at intervals extending transversely through said side plates, an annular tire construction between said side plates formed of a series of overlapping sections, wedge-shaped plates at intervals extending inwardly from said tire construction and having transverse slots through which said bolts extend, a friction block on each bolt and on each side of each wedge-shaped plate, and a spring between each friction block and the corresponding side plate, substantially as set forth.

4. A resilient vehicle wheel having a rim, annular side plates secured thereto and projecting beyond the rim, a tire between said side plates, a series of sectional plates with overlapping ends and lying between said side plates and on which said tire is mounted, inwardly extending wedge-shaped plates secured to said tire plates and having transverse slots therethrough, bolts extending through the side plates and the slots in the wedge-shaped plates, and an annular yielding frictional resisting means mounted on the bolt at each side of said wedge-shaped plate and bearing against said wedge-shaped plate.

5. A resilient vehicle wheel including a central body portion having a rim with inwardly extending V-shaped recesses located at intervals in the outer surfaces thereof, annular side plates secured to said rim and projecting radially beyond the same, bolts for securing said side plates to the rim extending through the rim between said recesses, other bolts extending through said side plates in registry with said recesses, an annular tire construction located between said side plates and formed of a series of overlapping sections, wedge-shape plates extending inwardly from said tire construction and in registry with said recesses in the rim and having transverse slots through the same through which said last-mentioned bolts extend, an annular friction member on each bolt at each side of each wedge-shape plate, and a spring between each friction member and the corresponding side plate, substantially as set forth.

In witness whereof, I have hereunto affixed my signature in the presence of the witnesses herein named.

GEORGE G. DAVIS.

Witnesses:
J. H. WELLS,
R. G. LOCKWOOD.

Copies of this patent may be obtained for five cents each, by addressing the "Commissioner of Patents, Washington, D. C."